United States Patent

[11] 3,550,565

| [72] | Inventor | Francisco G. Sanchez<br>Manzanillo 38, Mexico City, 7, D.F., Mexico |
|---|---|---|
| [21] | Appl. No. | 778,674 |
| [22] | Filed | Nov. 25, 1968 |
| [45] | Patented | Dec. 29, 1970 |
| [32] | Priority | Nov. 27, 1967 |
| [33] | | Mexico |
| [31] | | No. 99956 |

[54] INTERNAL COMBUSTION ENGINE
9 Claims, 4 Drawing Figs.

[52] U.S. Cl.................................................... 123/8.41,
418/196, 418/200
[51] Int. Cl..................................................... F02b 53/00
[50] Field of Search........................................ 123/13,
13(B), 8(MS); 91/88, 92; 103/125; 230/150

[56] References Cited
UNITED STATES PATENTS

| 1,037,455 | 9/1912 | Diefenderfer | 230/150 |
| 1,046,280 | 12/1912 | Diefenderfer | 123/13(B) |
| 1,688,816 | 10/1928 | Kraus | 123/13(B) |
| 1,923,500 | 8/1933 | Northey | 123/8(MS)(UX) |
| 3,453,992 | 7/1969 | Graham | 123/13(B) |

*Primary Examiner*—Allan D. Herrmann
*Attorney*—Sparrow and Sparrow

ABSTRACT: A rotary internal combustion engine in which a first set of three rotary members cooperate to function as a pump and force a compressed air fuel mixture into a second set of three rotary members. The combustible mixture is ignited and forces the rotation of the second set of rotary members. The two sets of rotary members are identical in their design and construction.

INVENTOR
FRANCISCO GUTIERREZ SANCHEZ
BY
SPARROW AND SPARROW
ATTORNEYS

INTERNAL COMBUSTION ENGINE

BACKGROUND OF THE INVENTION

Internal combustion engines as known in the art, require a separate pump for producing a combustible mixture to be introduced into the cylinders of an engine to obtain mechanical output power. Such engines as known in the art, require considerable additional space for the separate pump, are not of the same design as the pump, and are thereby not as economical to produce as when pump and engine or motor are of equal design and construction.

Accordingly, it is an object of the present invention to provide an internal combustion arrangement in which an air fuel mixture is compressed through a rotary device similar to the motor or engine in which the combustible mixture is expanded. It is also a specific object of the present invention to provide an internal combustion engine in which all motions are of a rotary and nonreciprocating character.

SUMMARY OF THE INVENTION

An internal combustion engine arrangement in which three rotary members cooperate to form a compressor for the purpose of compressing a combustible air fuel mixture. Carburetors communicate with the housing of the three rotary members of the compressor and feed to them the air fuel mixture for compression. The compressed mixture is passed to a duplicate set of three rotary members cooperating to function as a motor. When ignited within the housing confining the second set of three rotary members, the combustible mixture expands and acts upon the rotary members so as to provide a pure rotational mechanical output.

DESCRIPTION OF THE PREFERRED EMBODIMENTS

Figure 2:
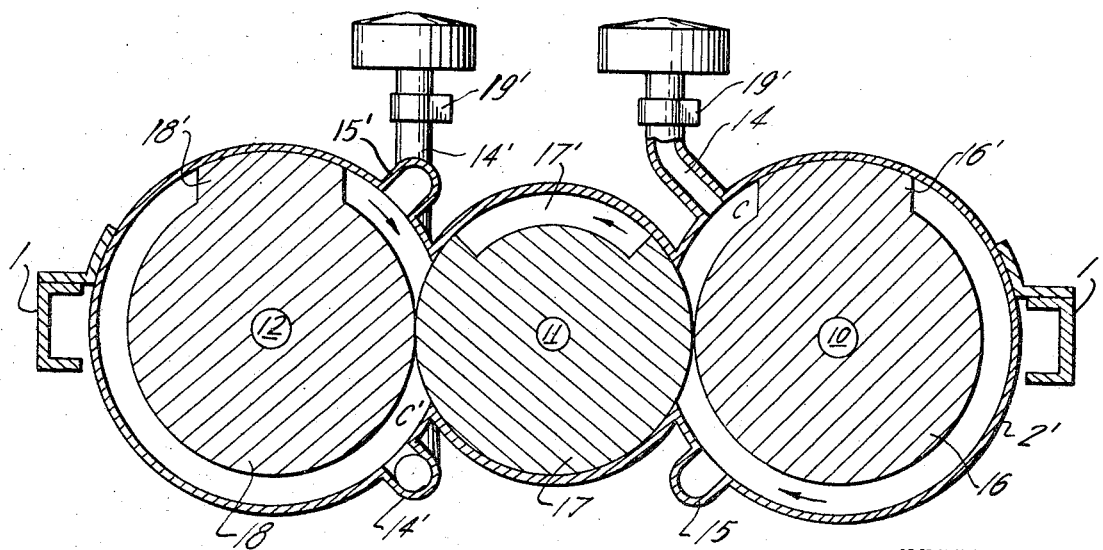
FIG. 2 is a sectional view through the compressor unit of the engine of FIG. 1.
Figure 4:
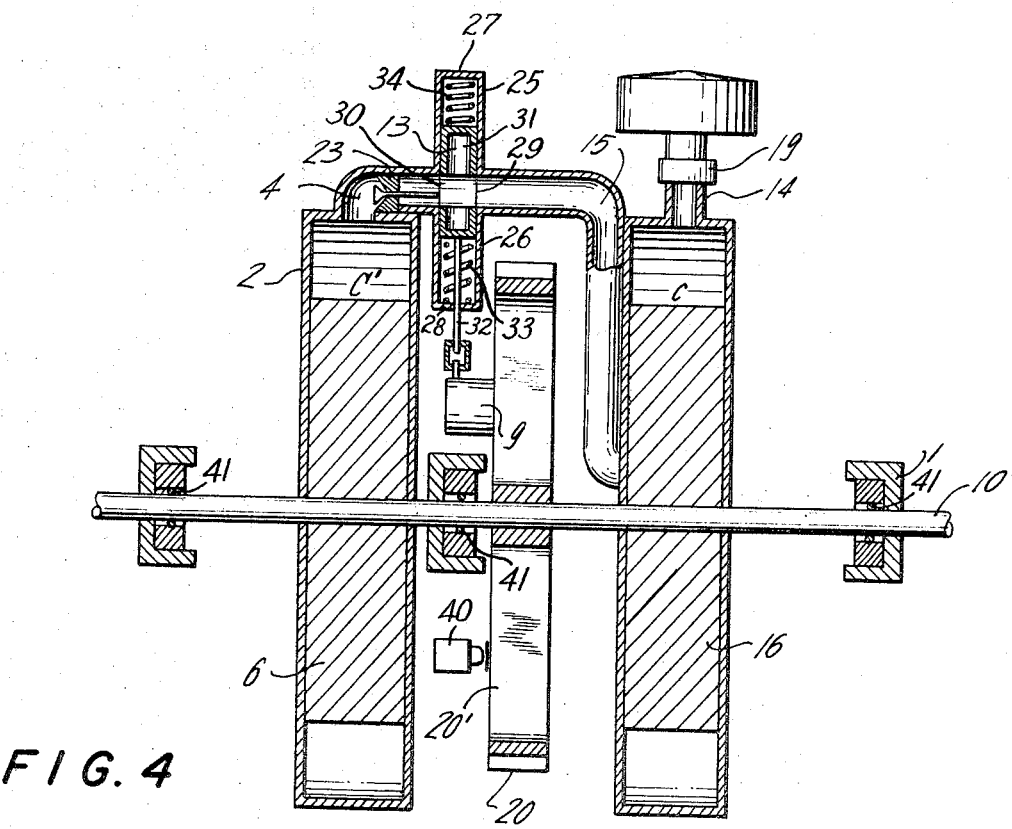
FIG. 4 is a sectional view taken along line IV–IV in FIG. 1.

Referring to the drawing, the compressor or injection unit of the internal combustion engine of the present invention is shown in FIGS. 2 and 4. The air fuel mixture is supplied by carburetors 19 and 19' and transmitted to the spaces $c$ and $c'$ associated with the rotary members 16 and 18. These rotary members each have a projecting portion 16' and 18'. An intermediate rotary member 17 is provided with a recess 17' alternately engaging the projecting portions 16' and 18'. The three rotary members are mounted on respective shafts 10, 11 and 12 which are held in ball bearings 41 supported by the frame 1. A housing 2' has its internal wall swept by the projecting portions 16' and 18', as well as the exterior diameter of the intermediate rotary member 17.

When the projecting portion 16' rotates, the volume of the space $c$ is increased and a combustible mixture from the carburetor 19 is sucked from the space $c$ through the connecting pipe or manifold 14. This mixture becomes compressed through the same projecting portion 16' during its next revolution and becomes forced out of the space $c$ through the outlet port or pipe 15.

The piping or tubing 15 communicates with a valve 13 which opens at the end of the compression cycle. Valve 13 consists of a first tubular member 25 and of a second tubular member 26 both of which have closed ends 27,28 respectively. Members 25 and 26 have side perforations 29, 30 for receiving pipe 15. Valve piston 31 is operated over a rod member 32 which is linked to plate member 9. Piston 31 is supported by spring members 33,34. The pressure of the mixture opens the check valve 23 and enters the combustion chamber $c'$. The three rotary members are coupled together through gears 20, 21 and 22 which maintain the rotary members in fixed phase relationship to each other. After all of the rotary members 16, 17 and 18 have turned 180°, the functional operation described in relation to the projecting portion 16' is repeated by the projecting portion 18'. A sliding valve and check valve identical to those shown in FIG. 4 are provided for this purpose of functioning together with the rotating member 18, not visible in the drawing and therefore not shown therein. Actuating plate member 9 are provided for actuating the sliding valves 13, as well as electrical switches 40 for firing the spark plugs.

In particular, the rotary members are supported on shafts 10, 11 and 12, respectively, held in bearings mounted within the housing frame. The rotary member 16 is provided with a projecting portion 16', whereas the rotary member 17 is provided with a recess or cavity portion 17'. The dimensions of the recessed portion 17' are such that it will totally accommodate the projecting portion 16' when the latter is rotated about the shaft 10 so that it enters the recess. The third rotary member 18 is identical in design and construction to the rotary member 16.

The arrangement between the projecting portions and the recessed portion is such that the exterior surface of the projecting portion does not contact the base or bottom of the recess when the rotary members are aligned whereby the projecting portion engages the recess. The circular diameters of the three rotary members are all of equal magnitude. Thus, the diameter of the circle passing through the base of the projecting portions, is equal to the diameter of the circle passing through the top surface of the recess. The housing 2' is in close contact with the exterior diameter of the rotary member 17. In relation to the rotary members 16 and 18, however, the housing 2' leaves spaces $c$ and $c'$. The internal walls of the housing 2', however, are swept by the projecting portions 16' and 18' as they are rotated about or with the shafts 10 and 12, respectively.

Inlets 14 and 14' communicate with the housing interior, and are associated with the spaces $c$ and $c'$, respectively. Similarly, outlets 15 and 15' communicate with the interior of the housing, and are associated with the rotary members 16 and 18, respectively. Gears 20, 21 and 22 are mounted upon the shafts 10, 11 and 12, respectively. These gears which may also be in the form of notched wheels, are in mesh with each other and synchronize the rotation of the three shafts and hence of the three rotary members 16, 17 and 18. In the embodiment as illustrated in the drawing, the three gear members 20, 21 and 22 are secured to their respective shafts which are rotatably held in bearings which may be of the ball bearing-type. A frame 1 serves to structurally hold and support the bearings, and reinforce the housing.

In operation of the compressor unit, rotary motion applied to any one of the shafts through, for example, the engine unit within housing 2, will result in rotation of all three shafts, since they are geared together. The Projecting portion 16' will thus rotate and increase the volume of the space $c$. This action lowers the pressure within this space and air or fluid is sucked into this space $c$ through the intake 14. As the projecting portion 16' advances the fluid is continued to be sucked in through the duct 14 and fills the space around the rotary member 16 between the latter and the housing 2'. The fluid will then be ejected or forced out under pressure through the outlet 15 during the next revolution, at which time a new suction cycle prevails simultaneously. After all members have turned 180° the identical functional operation is carried out at the opposite side of the compressor arrangement. The action is such that the two projecting portions alternate in their functional operation.

Figure 1:
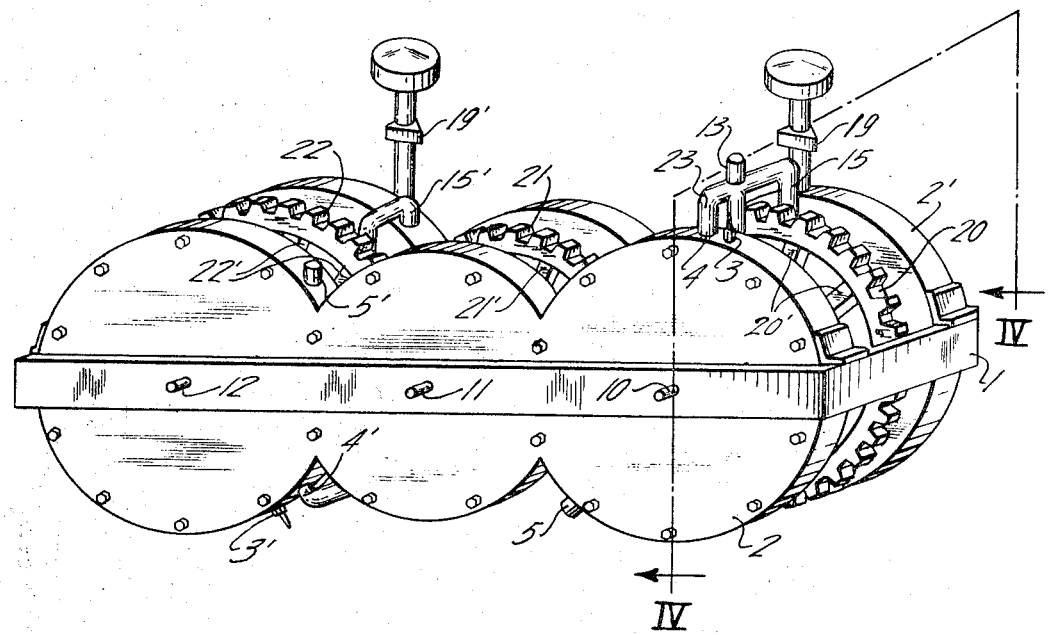
FIG. 1 is an isometric view and shows the assembly of the compressor unit and combustion unit of the rotary internal combustion engine, in accordance with the present invention.
Figure 3:
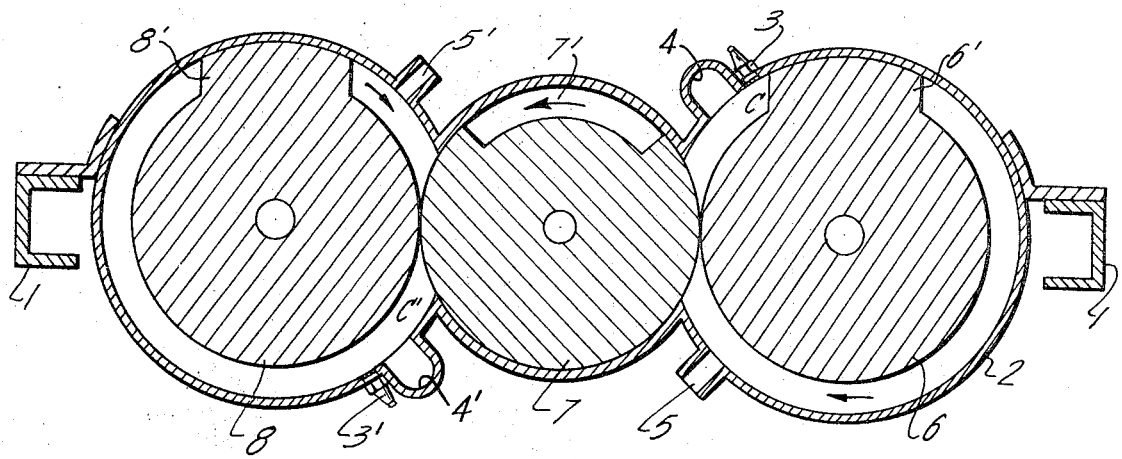
FIG. 3 is a sectional view of the combustion unit of the engine of FIG. 1.

The combustion unit shown in FIG. 3 is provided with spark plugs 3 and 3', the latter not being visible in FIG. 2, receiving electrical impulses from the contact switches 40 actuated by the members 9. The compressed combustible mixture, supplied from the outlets 15 and 15' of the compressor unit, is admitted into the combustion unit through the inlet pipes 4 and 4' (FIG. 1). The exhaust gases leave the combustion unit through the outlets 5 and 5'.

Within the housing 2 are rotary members or impellers 6, 7 and 8. The rotary members 6 and 8 have projecting portions 6' and 8', respectively, similar to those described for the compressor or injecting unit associated with the members 16 and 18. At the same time, the intermediate rotary member 7 has a recess for alternately accommodating the entrance of the projecting portions 6' and 8'. The three rotary members 6, 7 and 9 are synchronized in phased relationship to each other through the gears 20, 21 and 22. The functional relationship between these three rotary members 6, 7 and 8 is similar to that described for the compressor unit.

The basic diameters of all rotary members are equal in magnitude, when omitting the projecting portion and the recess. The dimension of the recess are such that they fully accommodate the projecting portions, and the latter do not contact the bottom of the recess when admitted thereinto. The three gears 20, 21 and 22 are all of equal diameter and synchronize the rotational motions of all six rotary members. In place of solid webs these gears may have spokes 20', 21' and 22' shaped in the form of blades for the purpose of cooling the engine.

The shaft 11 serves to mechanically link the rotary members 7 and 17 with the gear 21. The action of the two adjacent shafts 10 and 12 is similar in the respect of mechanically linking their respective rotary members mounted on the shaft. Thus, for example, the rotary members 7 and 17, as well as the gear 21 are fixedly mounted on the shaft 11.

In operation of the combustion unit, the combustible mixture admitted into the space C is ignited by the spark plug 3. The resulting explosion or expansion of the gases applies pressure against the projecting portion 6', and thereby rotates the member 6. The shaft 10 also rotates, thereby, and transmits the rotary motion to the other rotary members through the action of the gears 20, 21 and 22 which interconnect these three shafts. The burned gases which fill the space C are forced out through the exhaust openings or ports 5 by the same projecting portion 6' during the next revolution. After all of the rotary members of the combustion unit have rotated 180°, the same functional operation will be carried out by the rotary member 8, at the opposite side of the combustion unit.

Thus, while the projecting portion 16' acts to suck into the space c combustible mixture from the carburetor 19, the combustible mixture that was sucked in during the previous revolution is compressed and forced out through the opening 15. Sliding valve 13 becomes actuated through the member 9, at the end of the compression cycle. The combustible mixture is thereby permitted to pass into the combustion chamber C. Immediately thereafter the same actuating plate member 9 actuates a conventional switch for firing the spark plug 3 to produce a spark. The resulting explosion or expansion of the gases closes the valve 23 and acts against the projecting portion 6'. With the rotation of the member 6, shaft 10, and member 16, all other members are also rotated through the action of the gears. When the engines rotary members have rotated 180°, the members at the opposite side of the unit combine to repeat the preceding functional operation.

Thus, the projection portion 18' of the compressor unit first sucks in and then forces a combustible mixture into the combustion chamber formed through the space C' by way of the sliding valve and the check valve which are equal to those shown in FIG. 4, but which are not visible in the drawing. The actuating member actuates the sliding valve, at the end of the compression cycle, in addition to another conventional switch 40 for firing the spark plug 3'. The resulting explosion closes the check valve and applies pressure against the projecting portion 8' of the rotating member 8. The shaft 12 and member 18 are consequently also rotated, and through the presence of the gears 20, 21 and 22, all other rotary members are similarly acted upon. The burned or exhaust gases are forced out through the exhaust openings or pipes 5 and 5' located in a sidewise relationship. Cooling of the engine can be accomplished through conventional techniques of circulating either liquid or air, or both in combined form.

The compressor unit, when acting independently in accordance with the present invention may also be operated as a motor. In this case, compressed fluid in either gaseous or liquid form is admitted into the space c, by way of the intake opening 14. The compressed fluid applies pressure against the projecting portion 16' and thereby rotates the wheel or member 16, and hence the gear 20 through the shaft 10. As the projecting portion 16' advances, the exhaust or outlet port 15 is uncovered and the expanded fluid exists from the arrangement operated as a motor. After all the wheels have turned 180° the compressed fluid commences to act against the projecting portion 18', at the opposite side of the arrangement. The function of the rotary member 18 is similar to that described for the member 16, and as a result continuous rotary motion is realized at the output of the arrangement. The three gears 20, 21 and 22 serve to maintain the rotational members in the proper phase relationship to each other.

While the invention has been described and illustrated with respect to certain preferred examples which give satisfactory results, it will be understood by those skilled in the art after understanding the principle of the invention, that various changes and modifications may be made without departing from the spirit and scope of the invention.

I claim:

1. A rotary internal combustion engine comprising, in combination, a compressor arrangement and a combustion arrangement each including a housing, a first rotary member within said housing and having a projecting portion on the circumference thereof, a second rotary member mounted adjacent to said first rotary member and having a recessed portion along its circumference into which said projecting portion is insertable, and a third rotary member mounted adjacent to said second rotary member within said housing and having a projecting portion insertable into said recessed portion; carburetor means connected to said compressor arrangement for feeding to said compressor arrangement a mixture of air and fuel, said compressor arrangement compressing said mixture and transferring the compressed mixture to said combustion arrangement; spark plug means in said combustion arrangement for igniting the mixture of air and fuel transferred from said compressor arrangement to said combustion arrangement; and coupling means for coupling the rotary motions of said rotary members in predetermined relationship to each other, whereby said compressed mixture after ignition by said spark plug means forces the rotary members within said combustion arrangement to rotate and thereby provide mechanical output energy.

2. The rotary internal combustion engine as defined in claim 1 including valve means for transferring said compressed mixture into said combustion arrangement from said compressor arrangement; and exhaust port means for expelling the burned products of said mixture from said combustion arrangement after ignition of said mixture.

3. The rotary internal combustion engine as defined in claim 2 wherein said valve means is a sliding valve comprising a first tube member partially closed at its ends; a second tube member slidable within said first tube member and having closed ends, said tube members having side perforations; a spring member acting against each end of said second tube member; and a rod member secured to one end of said second tube member and said coupling means.

4. The rotary internal combustion engine as defined in claim 1 including switch actuating means operated by said coupling means for igniting said spark plug means.

5. The rotary internal combustion engine as defined in claim 1 wherein said coupling means comprises three gear members each securely linked to two rotary members and in mesh with the adjacent gear member.

6. The rotary internal combustion engine as defined in claim 5 including fan blade-shaped spokes in said gear members for cooling said combustion arrangement.

7. The rotary internal combustion engine as defined in claim 1 including release check valve means for limiting explosions to said combustion arrangement.

8. The rotary internal combustion engine as defined in claim 1 including shafts for rotatably supporting said rotary members, said shafts being parallel to each other.

9. The rotary internal combustion engine as defined in claim 8 including ball bearings for rotatably holding said shafts; and frame means for supporting said bearings.